United States Patent
Young

(10) Patent No.: US 7,024,523 B1
(45) Date of Patent: Apr. 4, 2006

(54) HOST ADAPTER INTEGRATED DATA FIFO AND DATA CACHE AND METHOD FOR IMPROVED HOST ADAPTER SOURCING LATENCY

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 255 days.

(21) Appl. No.: 10/280,955

(22) Filed: Oct. 25, 2002

(51) Int. Cl.
*G06F 12/00* (2006.01)

(52) U.S. Cl. .................. 711/154; 711/123; 711/168; 710/52

(58) Field of Classification Search ............. 711/154, 711/150, 167, 168, 123, 149; 710/52, 56, 710/57
See application file for complete search history.

(56) References Cited

U.S. PATENT DOCUMENTS

| | | | |
|---|---|---|---|
| 6,161,169 A * | 12/2000 | Cheng | 711/150 |
| 6,167,487 A * | 12/2000 | Camacho et al. | 711/131 |
| 6,216,199 B1 * | 4/2001 | DeKoning et al. | 711/3 |
| 6,725,348 B1 * | 4/2004 | Marier et al. | 711/169 |
| 6,748,486 B1 * | 6/2004 | Burton et al. | 711/112 |

* cited by examiner

Primary Examiner—Brian R. Peugh
(74) Attorney, Agent, or Firm—Gunnison, McKay & Hodgson, L.L.P.; Forrest Gunnison

(57) ABSTRACT

A host adapter, which interfaces two I/O buses, caches data transferred from one I/O bus to another I/O bus in a data first-in-first-out (FIFO)/caching memory. In addition, when a target device on the another I/O bus is ready to receive the data, data is transferred from the data FIFO/caching memory even though not all of the data may be cached in that memory. Hence, data is concurrently transferred to and transferred from the data FIFO/caching memory. The data transfer to the target device is throttled if cached data is unavailable in the data FIFO/caching memory for transfer, e.g., the data cache is empty for the current context.

21 Claims, 10 Drawing Sheets

US 7,024,523 B1

HOST ADAPTER INTEGRATED DATA FIFO AND DATA CACHE AND METHOD FOR IMPROVED HOST ADAPTER SOURCING LATENCY

BACKGROUND OF THE INVENTION

1. Description of Related Art

The present invention relates generally to data transfer from a host system to a SCSI target, and more particularly, to reducing the latency associated with a data transfer from a host system to a target device via a host adapter.

2. Description of Related Art

Host adapter integrated circuits, sometimes called host adapters, were widely used for interfacing two I/O buses such as a host computer I/O bus and a SCSI bus. FIGS. 1A and 1B are representations of data paths through a prior art host adapter 100 for transfer of data from a host system 180 to a SCSI target device in a plurality of SCSI target devices 191, 192, 193.

In a data transfer from host system 180 to a SCSI target device, it was sometimes desirable to cache the data on host adapter 100. The advantage of caching the data was that the data was transferred only once over host I/O bus 181.

Prior art caching host adapters, such as host adapter 100, required that all the data for a write operation to a SCSI target device be cached in data caching memory 160 before host adapter 100 sent a write command to the SCSI target device. When very many commands are queued in host adapter 100, data for a new write command for a particular SCSI target device was cached in memory 160 while previous commands for that particular SCSI target device were executed. In this case, multiplexer 111 was configured by direction control module 170 to transfer data from host I/O bus 181 to host DMA engine 120. Multiplexer 113 was configured by direction control module 170 to transfer data from host DMA engine 120 to data caching memory 160.

For this situation, the data was transferred only once over host I/O bus 181. When the target device was ready to execute the new write command, the cached data was transferred from memory 160 through multiplexer 113 to multiplexer 112 and through multiplexer 112 to first-in-first-out (FIFO) memory 140. The data was transferred from FIFO memory 140 through SCSI module 150 to the SCSI target device. Thus, when the SCSI target device was ready to receive the data from the new write command, the data was available from data caching memory 160 with virtually no latency.

However, a problem arose when there were not enough commands queued in host adapter 100 to permit overlapping execution of one command for a SCSI target device with caching data, for another command, in memory 160 for that SCSI target device. If the SCSI target device had to wait for the caching of the data, i.e., wait until the data had been completely transferred from host system 180 to memory 160, the latency for providing the data to the target was considerable.

To remove this latency, the data path illustrated in FIG. 1B was used. When a target was ready to receive data and the data was not cached in memory 160, host adapter 100 connected host I/O bus 180 directly to target DMA engine 130 through multiplexers 111 and 112. Hence, the data was transferred directly from the host buffer memory to FIFO 140. While this technique removed the latency of waiting for all the data to be cached in memory 160, the technique degraded the utilization of host I/O bus 181, because the same data had to be transferred across bus 181 when that data was written to multiple SCSI target devices. Consequently, host adapter 100 required either suffering the latency penalty of waiting for all the data to be cached, or alternatively, degrading the utilization of the host system I/O bus.

SUMMARY OF THE INVENTION

According to one embodiment of the present invention, a host adapter, which interfaces two I/O buses, caches data transferred from a first I/O bus to a second I/O bus in a data first-in-first-out (FIFO)/caching memory. In addition, when a target device on the second I/O bus is ready to receive the data, data is transferred from the data FIFO/caching memory even though not all of the data may be cached in the data FIFO/caching memory. If necessary, data is transferred to and transferred from the data FIFO/caching memory concurrently, i.e., if not all the data is in the data FIFO/caching memory when the target is ready to receive data. The data transfer to the target device is throttled if cached data is unavailable in the data FIFO/caching memory for transfer, e.g., the data cache in the FIFO/caching memory is empty, which means no cached data for the current context is available for transfer.

Herein, a context is associated with a command in a SCB. Thus, the data for a context is concurrently cached in data FIFO/caching memory and transferred from data FIFO/caching memory.

This method of data transfer by the host adapter eliminates the need for a separate path through the host adapter when no data is available in the data FIFO/caching memory for the target device, but the target device is ready to receive data. This method also reduces congestion on the first I/O bus, because when the target device is ready to receive data and data is unavailable in the data FIFO/caching memory, the data is cached in that memory as the data is delivered concurrently to the target device. For applications that require multiple copies of the same data, e.g., RAID 1 operations, this eliminates transferring the same data multiple times over the first I/O bus.

Hence, in this embodiment, the method caches data in a memory of a host adapter interfacing a first I/O bus and a second I/O bus. The method also transfers a portion of the data from the memory concurrently with caching another portion of the data in the memory. The data is for the same context. In one embodiment, a queue of host adapter hardware control blocks, for which the caching of data is to be performed, is maintained. Caching of data associated with a host adapter hardware control block is enabled following removing the host adapter hardware control block from the queue. According to one embodiment, an enable caching flag in the host adapter hardware control block is asserted to indicate the enabling of the caching of data. The method also determines whether the enable caching flag is asserted in the host adapter hardware control block prior to initiating the transfer of the data. Further, the method throttles the transfer of data based upon whether cached data is available for transfer, e.g., whether the data cache is empty.

Another embodiment of the method includes:
  loading a pointer to a hardware control block in an execution queue of a host adapter interfacing a first I/O bus and a second I/O bus;
  loading another pointer to the hardware control block in an enable caching queue of the host adapter; and
  removing the another pointer to the hardware control block from the enable caching queue upon a first I/O bus data transfer module becoming available;

enabling the first I/O bus data transfer module to transfer data from the first I/O bus to a data first-in-first-out (FIFO)/caching memory of the host adapter following the removing the another pointer;

asserting a flag in the hardware control block to indicate the enabling the first I/O bus data transfer module;

caching data in the data FIFO/caching memory by transferring the data from the first I/O bus to the data FIFO/caching memory using the first I/O bus data transfer module following the enabling;

removing the pointer to the hardware control block from the execution queue;

determining-whether the flag in the hardware control block is asserted; and transferring the data from the data FIFO/caching memory upon the determining finding that the flag in the hardware control block is asserted.

In one embodiment, a host adapter includes a first I/O bus data transfer module and a second I/O bus data transfer module. A data first-in-first-out (FIFO)/caching memory is coupled to the first I/O bus data transfer module and to the second I/O bus data transfer module. A throttle control module is coupled to the first I/O bus data transfer module, to the second I/O bus data transfer module, and to the data FIFO/caching memory. The throttle control module controls data transfer from the data FIFO/caching memory by the second I/O bus data transfer module as data is concurrently being transferred into the data FIFO/caching memory using the first I/O bus data transfer module.

The first I/O bus data transfer module further comprises a data-FIFO/caching-memory destination address register. The second I/O bus data transfer module includes a data-FIFO/caching-memory source address register. The throttle control module includes an empty detector coupled to the data-FIFO/caching-memory destination address register and to the data-FIFO/caching-memory source address register. The empty detector has an output line coupled to the second I/O bus data transfer module and a signal on the output line is used to start and stop data transfer by the second I/O bus data transfer module based upon whether the data cache is empty. Thus, the empty detector throttles the data transfer by the second I/O bus data transfer module.

BRIEF DESCRIPTION OF THE DRAWINGS

In the drawings and the following detailed description, elements with the same reference numeral are the same or equivalent elements. Also, the first digit of a reference numeral is the number of the drawing in which the element having that reference numeral first appeared.

DETAILED DESCRIPTION

Figure 1A:
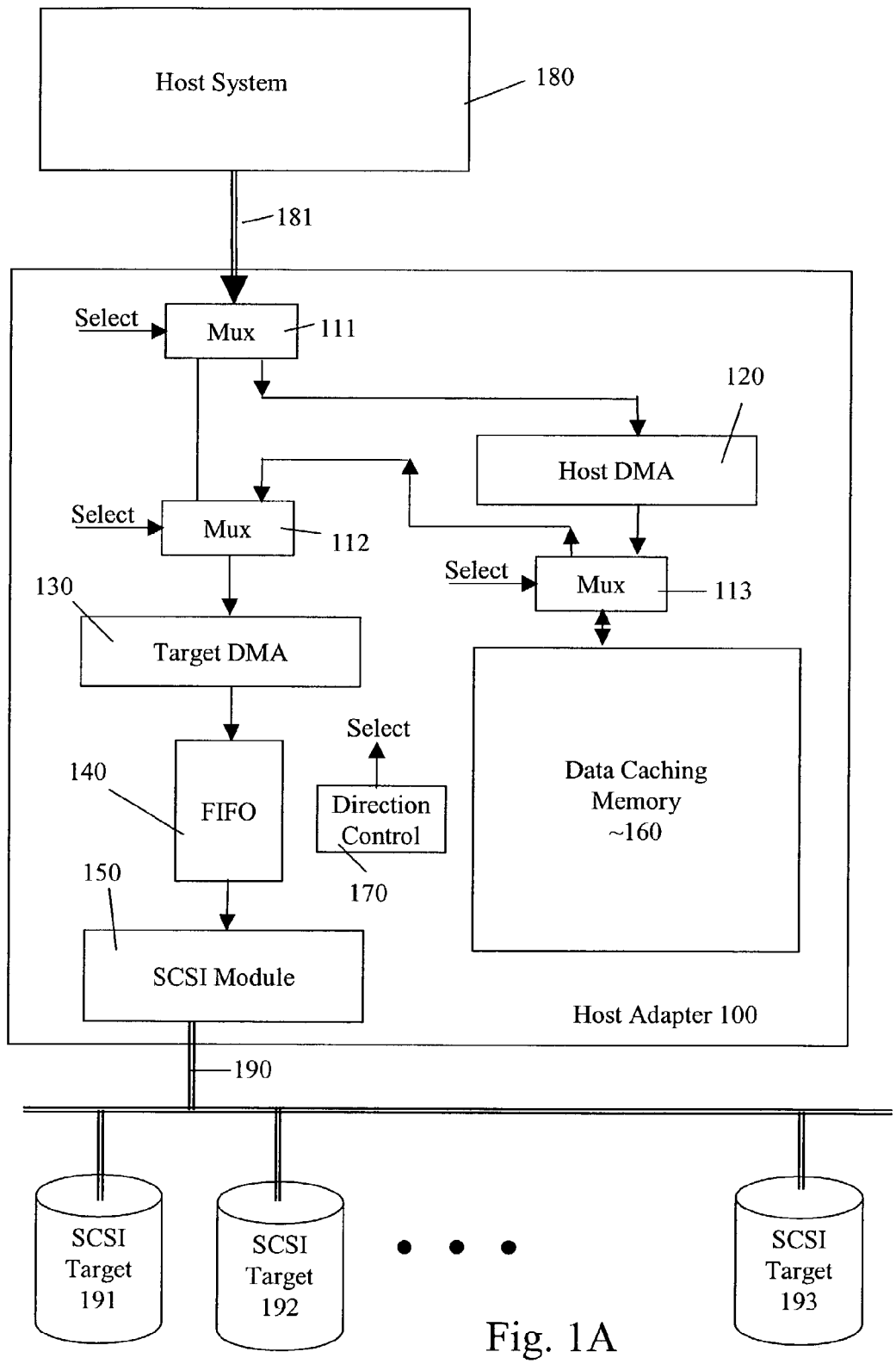
FIG. 1A is block diagram of a system with a prior art host adapter configured to cache write data in a host adapter memory when multiple commands for the same SCSI target device were available for execution.
Figure 1B:
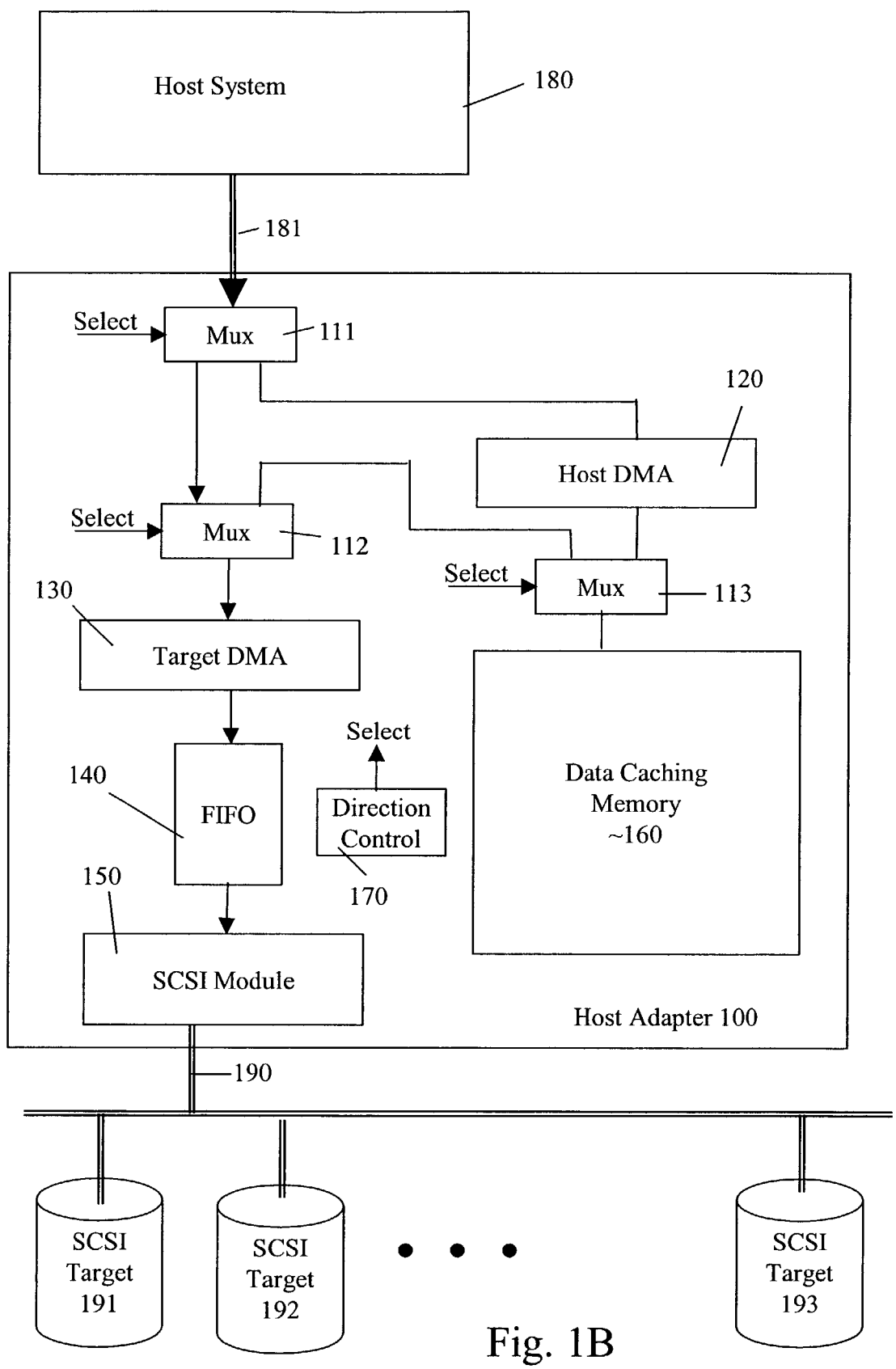
FIG. 1B is block diagram of the system of FIG. 1A configured to pass write data directly through the host adapter without caching when a SCSI target was ready to receive the write data, and that write data was not already cached in the host adapter memory.

According to one embodiment of the present invention, a host adapter 200, which interfaces two I/O buses 281, 290, caches data transferred from one I/O bus 281 to another I/O bus 290 in a data first-in-first-out (FIFO)/caching memory 260. In addition, when a target device, e.g., target device 292, on I/O bus 290 is ready to receive the data, data is transferred from memory 260 even though not all of the data may be cached in memory 260. The data transfer to target device 292 is throttled if cached data is unavailable in memory 260 for transfer, e.g., the data cache is empty.

This method of data transfer by host adapter 200 eliminates the need for a separate path through host adapter 200 when no data is available in memory 260 for target device 292, but target device 292 is ready to receive data. This method also reduces congestion on I/O bus 281, because when target device 292 is ready to receive data and data is unavailable in memory 260, the data is cached in memory 260 as the data is delivered concurrently to target device 292. For applications that require multiple copies of the same data, e.g., RAID 1 operations, this eliminates transferring the same data multiple times over I/O bus 281.

Finally, the method enhances utilization of I/O bus 290. Data transfer to target device 292 is started as soon as target device 292 is ready to receive data independent of whether all the data is cached in memory 260. In the prior art, if the data had just started transferring to the host adapter memory from the host system, the target had to wait until all the data were cached in the host adapter memory before data transfer to the target was started.

Hence, in this embodiment of the invention, data passes through data FIFO/caching memory 260, which, in one embodiment, is random access memory of host adapter 200. Memory 260 is used concurrently as both a cache memory and a FIFO memory and so is called data FIFO/caching memory 260. As described above, this concurrent functionality removes the prior art requirement to complete caching of the data before initiating transfer of the data to a target device.

As explained more completely below, a first unit of data, e.g., a first byte of data, a first word of data, a first double word of data, a first packet of data, etc., transferred over I/O bus 281 to memory 260 immediately becomes available for transfer to the appropriate target device on I/O bus 290. When the data transfer to the appropriate target device is completed, all the data is cached in memory 260.

Herein, memory 260 is shown as included in host adapter 200. This is illustrative only and is not intended to imply or limit the invention to memory physically located on the same chip or board that implements the functionality of host adapter 200. Memory 260 is coupled to host adapter 200 so that the functionality described herein can be implemented.

The size of memory 260 determines the number of SCBs for which data can be cached. A manager executing on host system 280 determines the memory requirements for the data associated with each SCB. This manager limits the number of new SCBs made available to host adapter 200 based upon the size of memory 260 and the data storage requirements of SCBs awaiting execution by host adapter 200. Generally, cost constraints determine the size of memory 260.

Figure 2A:
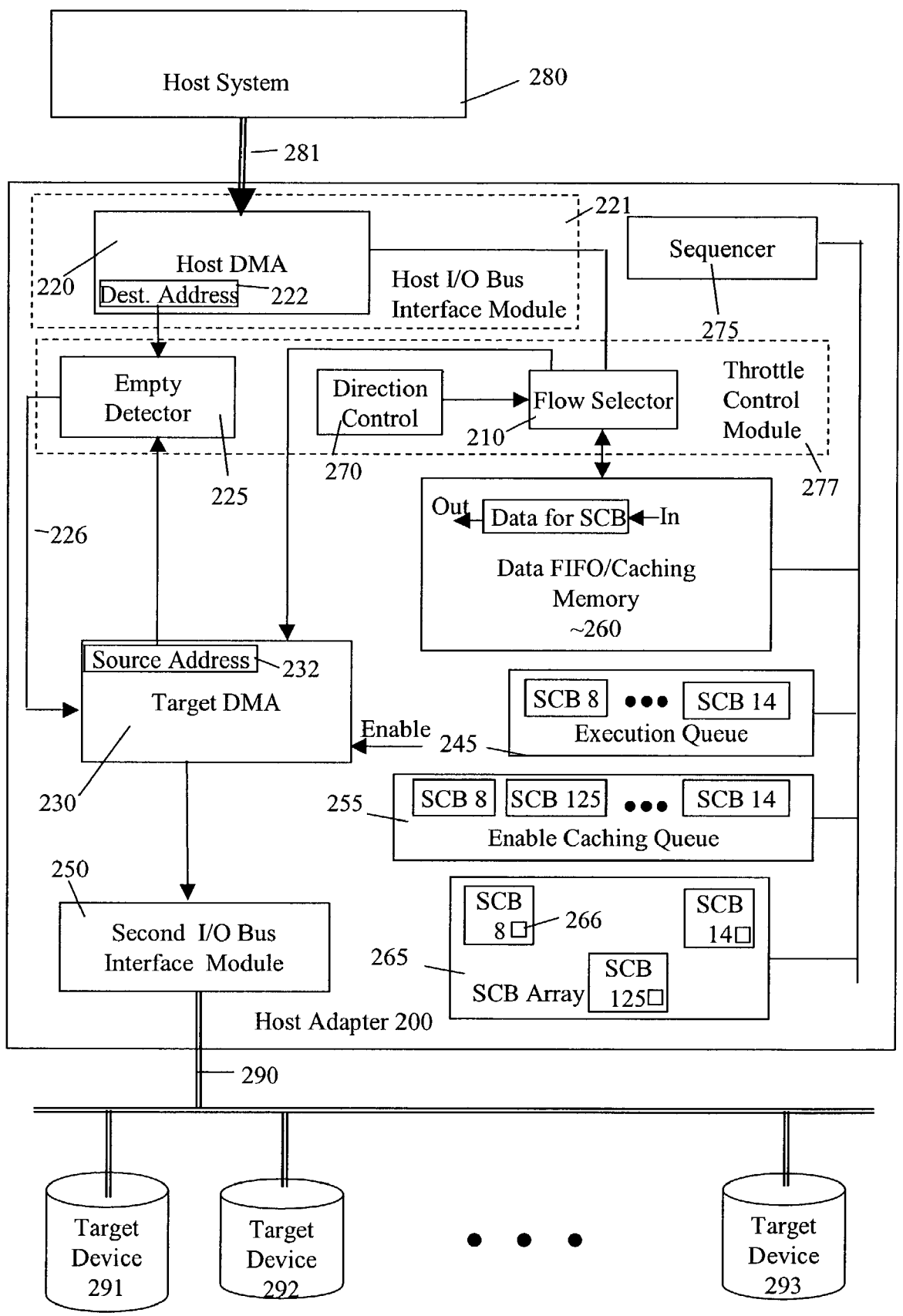
FIG. 2A is a block diagram of a system that includes a host adapter interfacing a first I/O bus, e.g., a host system I/O bus, to a second I/O bus, and including a data FIFO/caching memory, according to one embodiment of the present invention.
Figure 2B:
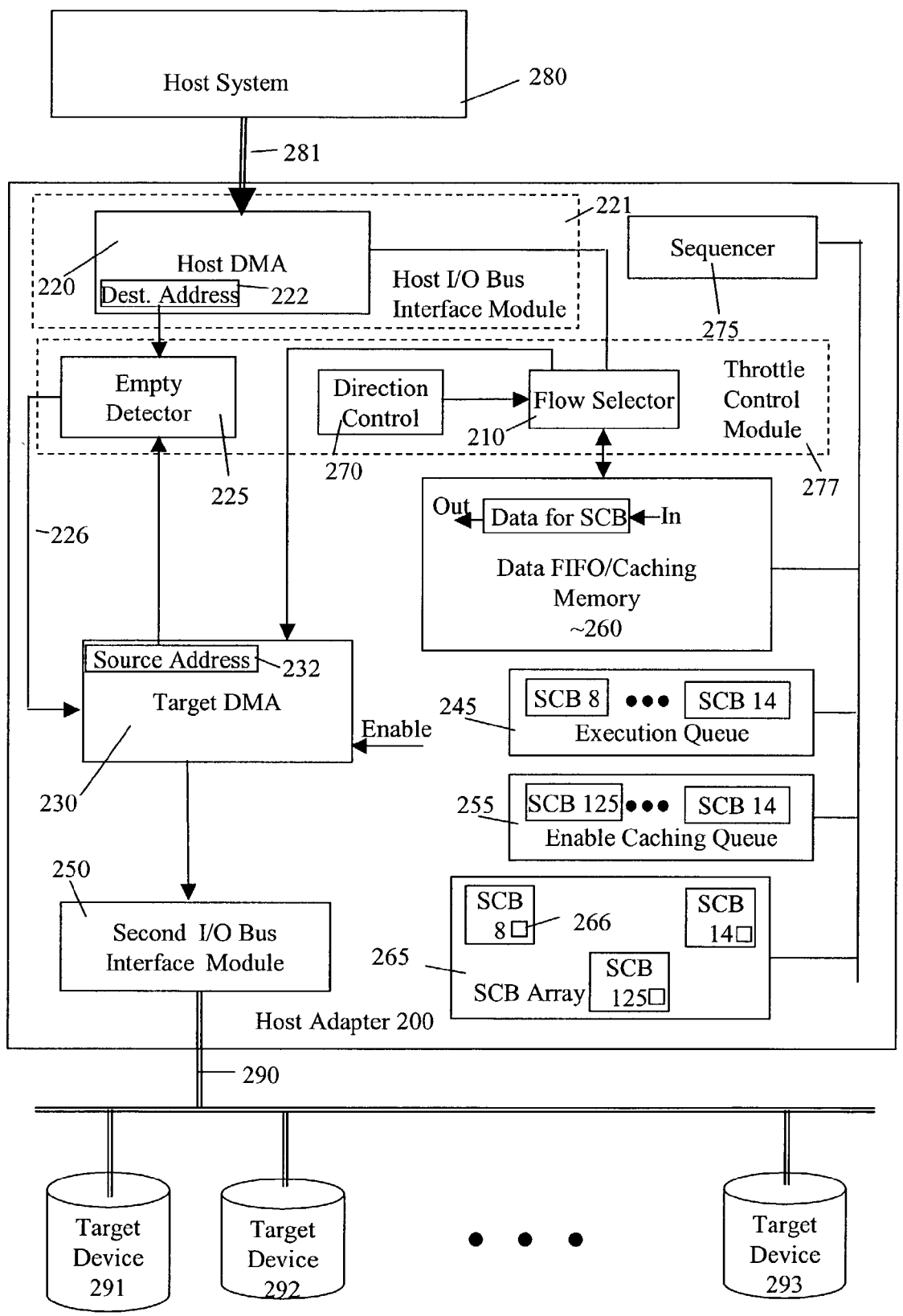
FIG. 2B is a block diagram of the system of FIG. 2A after a SCB has been removed from the DMA queue, according to one embodiment of the present invention.
Figure 2C:
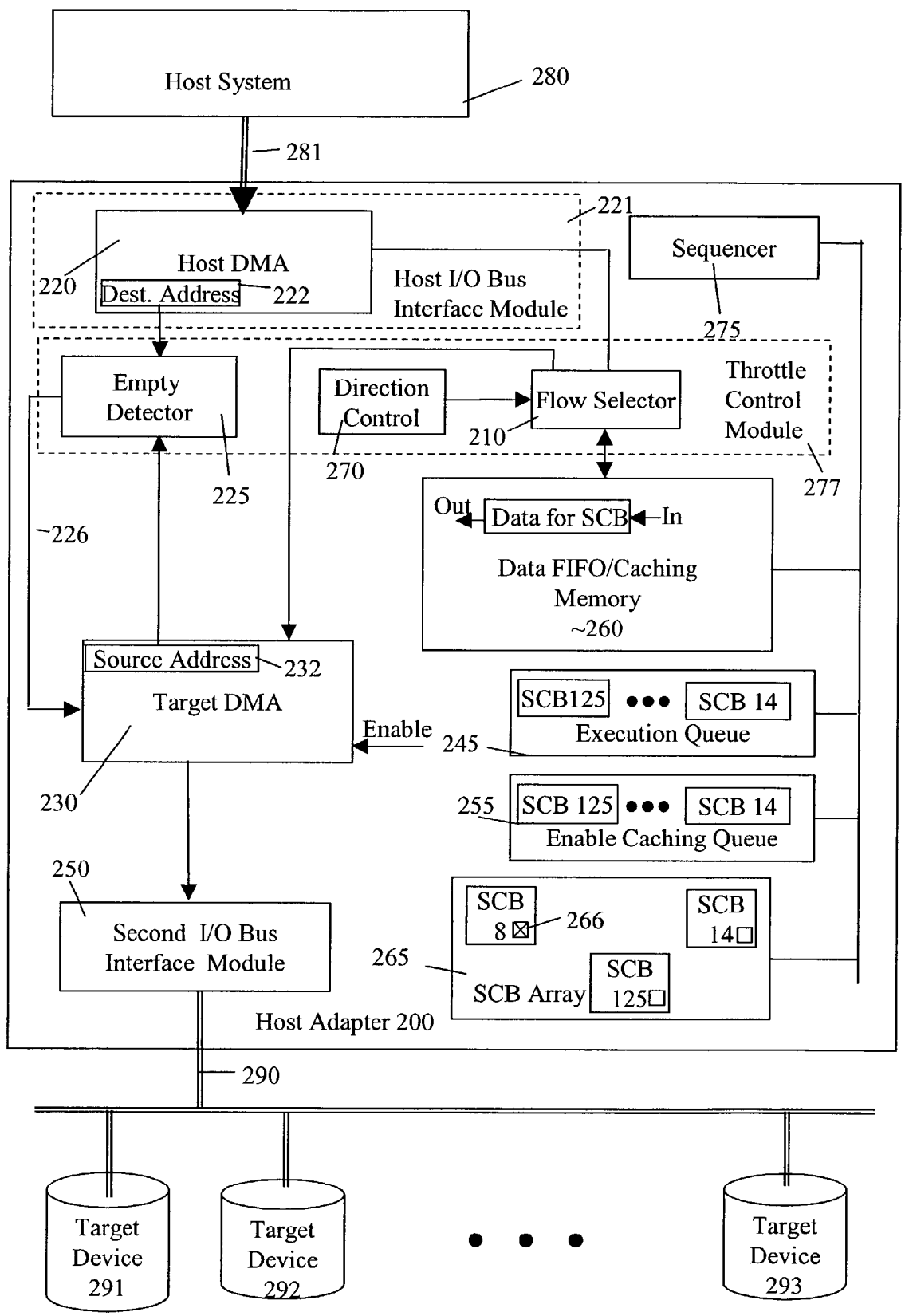
FIG. 2C is a block diagram of the system of FIGS. 2A and 2B after a SCB has been removed from the DMA queue and the host DMA module has been enabled for the removed SCB, according to one embodiment of the present invention.

Host adapter 200 includes modules and hardware in addition to those illustrated in FIGS. 2A to 2C. To avoid detracting from the description of this embodiment of the invention, only the modules and components necessary to understand the features of this embodiment of the invention are described.

In one embodiment of this invention, host adapter 200 includes a first I/O bus interface module 221 that in turn includes a first I/O bus data transfer module. This data transfer module accesses data in a memory of host system 280 and transfers that data over first I/O bus 281 to host adapter 200.

In this embodiment, first I/O bus data transfer module is a host direct memory access (DMA) module 220. However, host DMA module 220 is illustrative only and is not intended to limit the invention to only a DMA module that includes a DMA engine. The particular implementation of the first I/O bus data transfer module is not essential to this invention so long as the module provides the functionality described herein.

Each portion of the data provided by module 220 and a storage location for that portion of the data is passed to a flow selector 210 in a throttle control module 277. Flow selector 210, in response to signals from direction control module 270, enables the concurrency of reading and writing the data to data FIFO/caching memory 260. Specifically, flow selector 210 allows data caching in memory 260 concurrently with reading data from memory 260 for transfer to a target device on second I/O bus 290.

Depending on the implementation of memory 260, the two transfers may occur simultaneously through different ports, or alternatively be interleaved through a single port. In either case, appropriate pointers to random access memory 260 are maintained so that memory 260 functions as a FIFO for the cached data.

Figure 3:
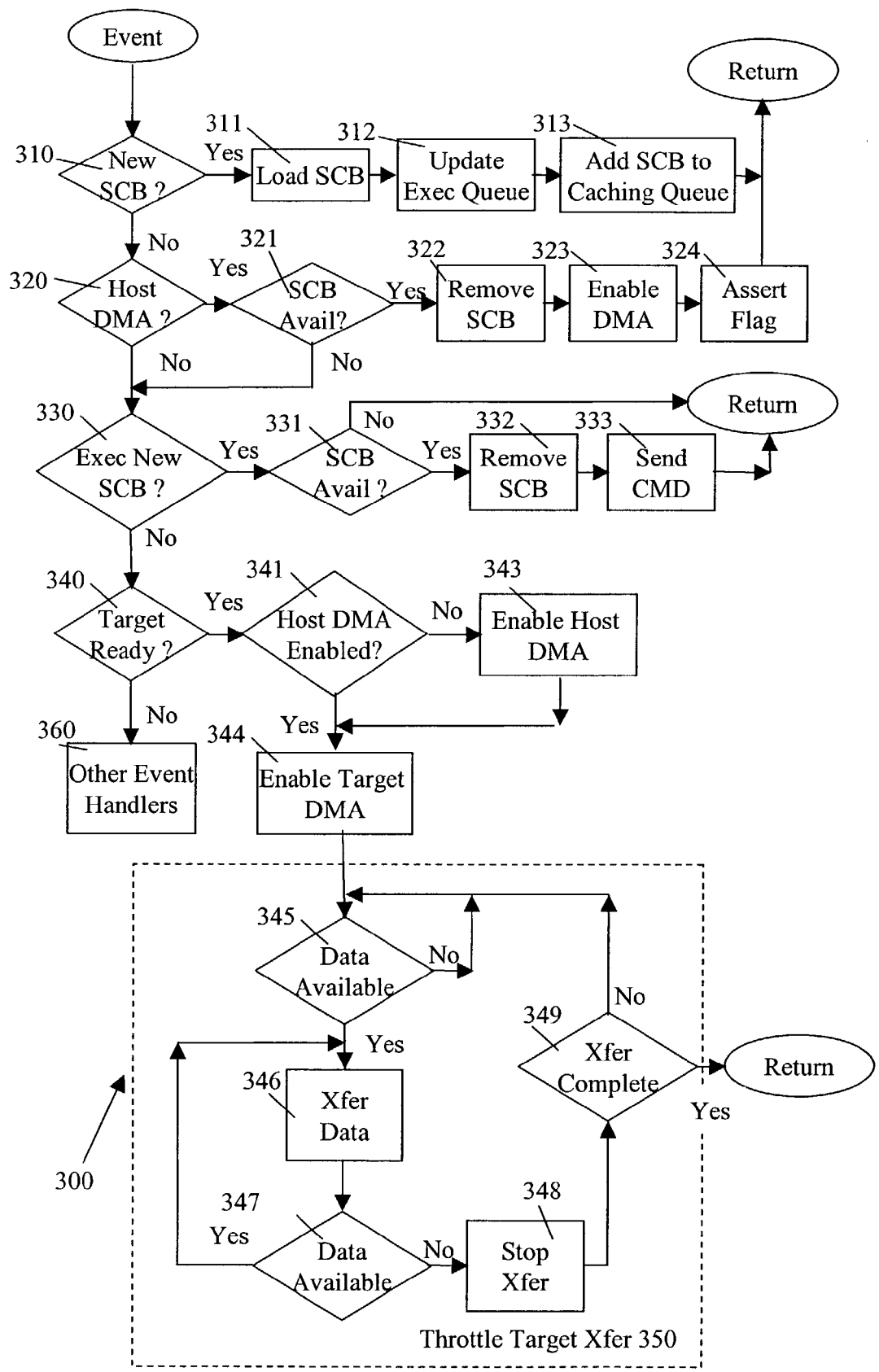
FIG. 3 is a process flow diagram for one embodiment of method concurrently caching data in a host adapter memory and transferring the data to a target I/O device.

FIG. 3 is a process flow diagram for one embodiment of a method 300 that is used with host adapter 200 to illustrate the principles of one embodiment of this invention. Typically, an on-chip sequencer 275, sometimes called sequencer 275, executes firmware that in conjunction with automated hardware controls the operation of host adapter 200. The information required to configure host adapter 200 to transfer data to or from host system 280 from or to a target device on I/O bus 290 is communicated to host adapter 200 via sequencer control blocks (SCBs).

A SCB is one embodiment of a hardware control block. Hence, the use of a SCB herein is illustrative only and is not intended to limit the invention to this particular embodiment of a hardware control block.

Typically, a host adapter driver (not shown) executing on host system 280 allocates an available storage site in SCB array 265 for a new SCB. The host adapter driver builds the SCB in a SCB storage memory of host system 200. The SCB is generated as in the prior art, except a caching enabled flag field is added. This field is configured by the host adapter driver so that as a default, a caching enabled flag in the field is de-asserted, e.g., flag 266 in SCB 8. After the host adapter driver completes building of the SCB, the host adapter driver loads a pointer to the new SCB in a new SCB queue in a memory of host system 280.

Sequencer 275 of host adapter 200 executes firmware that determines when the host adapter driver has added a new SCB to the new SCB queue in the memory of host system 280. In one embodiment, sequencer 275 configures a DMA engine in host adapter 200 to transfer the pointer in the new SCB queue to host adapter 200 and then to transfer the SCB addressed by the pointer to SCB array 265.

The particular method used to transfer the SCBs of this embodiment of the invention from host system 280 to SCB array 265 is not essential to the invention. However, one way suitable for use in this invention is presented in U.S. Pat. No. 6,006,292, entitled "Method of Managing Hardware Control Blocks Utilizing Endless Queue Maintained to Never be Empty and Containing Tail Pointer Only Accessible by Process Executing on System Processor," of B. Arlen Young issued on Dec. 21, 1999, which is incorporated herein by reference in its entirety.

Hence, when sequencer 275 of host adapter 200 determines that a new SCB is available from host system 280, new SCB check operation 310 (FIG. 3) transfers processing to load SCB operation 311 and otherwise processing transfers to host DMA available check operation 320. In load SCB operation 311, host adapter 200 transfers the new SCB from the SCB storage memory of host system 280 to a storage site in SCB array 265. Load SCB operation 311 transfers processing to update execution queue operation 312.

Upon entry of operation 312, sequencer 275 appends the SCB identification number of the new SCB to SCB execution queue 245. In this embodiment, the SCBs are executed according to the sequence in execution queue 245. Update execution queue operation 312 transfers to add SCB to caching queue operation 313.

In caching queue operation 313, sequencer 275 determines whether the new SCB specifies a transfer of data to a target device on I/O bus 290. If the new SCB does not specify transfer of data to a target device, e.g., does not include a write command, operation 313 returns. Conversely, if the new SCB specifies a transfer of data to a target device on I/O bus 290, sequencer 275 appends the SCB identification number of the new SCB to enable caching queue 255.

Thus, enable caching queue 255 is a queue of SCBs that each specify transfer of data from host system 280 to one or more target devices 291, 292, ..., 293 on I/O bus 290. In this embodiment, the entries in enable caching queue 255 are used as requests to transfer the data specified by the corresponding SCB from host system 280 and cache the data in memory 260. Upon completion, operation 313 returns.

Herein, when it is indicated that host system 280, host adapter 200 and/or a target device takes an action, those of skill in the art will understand that either an instruction or instructions are executed by a processor that in turn results in the action, or alternatively, hardware performs operations that result in the action. The particular technique used to implement the action is not essential to this invention.

The serial sequence of operations in FIG. 3 is illustrative only and is not intended to limit the invention to this particular embodiment. For example, sequencer 275 of host adapter 200 need not repeatedly poll through check operations 310, 320, 330, and 340. An event may occur that notifies sequencer 275 when action is required, and sequencer 275 responds to this event. Hence, check operations 310, 320, 330 and 340 are intended to show that sequencer 275 does not perform a particular set of actions until sequencer 275 determines that the actions are required by whatever means are used in a particular application of this embodiment of the present invention.

Also, depending upon the I/O bus protocols, other operations or alternatives may be added to FIG. 3. Thus, the sequence of operations in FIG. 3 is illustrative of one embodiment of the sequence of operations (a) to cache data, and (b) to enable concurrent caching of, data from one I/O bus, and removal of the data for transfer to the other I/O bus. Those of skill in the art will be able to implement alternative embodiments that achieve the advantages of this invention in view of this disclosure.

Host DMA check operation 320 determines whether host DMA module 220 is available to process a request in enable caching queue 255. If host DMA module 220 is available, processing transfers to SCB available check operation 321 and otherwise to execute new SCB check operation 330.

SCB available check operation 321 determines whether there is at least one SCB in enable caching queue 255. If there is at least one SCB in enable caching queue 255, check operation 321 transfers to remove SCB operation 322 and otherwise transfers to execute new SCB check operation 330.

In remove SCB operation 322, the oldest SCB in enable caching queue 255, e.g., SCB 8, is removed from queue 255 (FIG. 2B). In this embodiment, the pointer to the storage location in SCB array 265 is removed from enable caching queue 255. Operation 322 transfers processing to enable DMA operation 323.

In enable DMA operation 323, information in the SCB removed from queue 255, i.e., the SCB in SCB array 265 addressed by the pointer removed from queue 255, is used to configure and enable host DMA module 220 to transfer data, as specified in the SCB, from a memory in host system 280 and cache that data in memory 260. Operation 323 transfers to assert flag operation 324.

In assert flag operation 324, a caching enabled flag 266 in the caching enabled flag field of SCB 8 is asserted (FIG. 2C), e.g., in this embodiment, the caching enabled flag is asserted. Upon completion, operation 324 returns.

Execute new SCB check operation 330 determines whether sequencer 275 is ready to begin execution of a SCB from execution queue 245. If sequencer 275 is ready to begin execution of a SCB, processing transfers to SCB available check operation 331 and otherwise to target ready check operation 340.

SCB available check operation 331 determines whether there is at least one SCB in execution queue 245. If there is at least one SCB in execution queue 245, check operation 331 transfers to remove SCB operation 332 and otherwise returns.

In remove SCB operation 332, the oldest SCB in execution queue 245, e.g., SCB 8, is removed from queue 245 (FIG. 2B) for execution. In this embodiment, the pointer to the storage location in SCB array 265 is removed from execution queue 245. Operation 322 transfers processing to send command operation 333.

In send command operation 333, the command in the SCB removed from queue 245, e.g., SCB 8 in SCB array 265, is transmitted over I/O bus 290 to the target device specified in SCB 8. Upon completion, operation 333 returns.

Target ready check operation 340 determines whether the target device specified by the current SCB, i.e., the SCB being executed, which is SCB 8 in this example, has indicated that the target device is ready to receive data. If the target device specified in the current SCB has indicated that the target device is ready to receive data, processing transfers to host DMA enabled check operation 341 and otherwise to other event handlers operation 360.

Host DMA enabled check operation 341 determines whether caching enabled flag 266 in current SCB 8 is asserted. In the example of FIG. 2C, caching enabled flag 266 is asserted and so check operation 341 transfers to enable target DMA operation 344, which is explained more completely below.

Figure 4A:
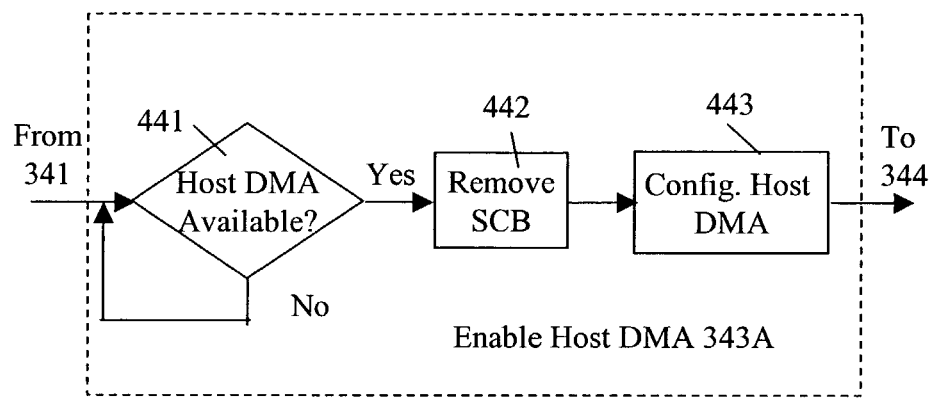
FIG. 4A is a first embodiment of a process for enabling a host adapter module in a host adapter when a target device is ready to receive data and none of the data is cached in the host adapter memory.
Figure 4B:
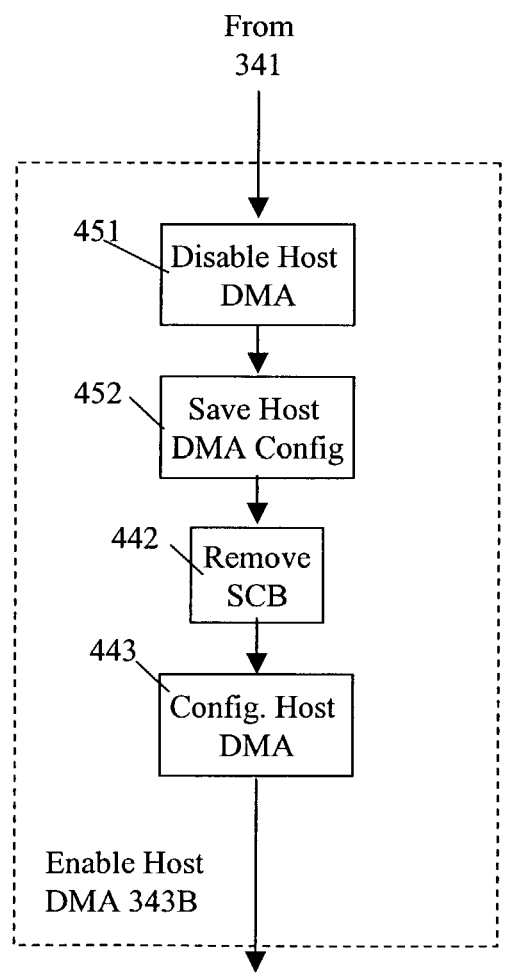
FIG. 4B is a second embodiment of a process for enabling a host adapter module in a host adapter when a target device is ready to receive data and none of the data is cached in the host adapter memory.
Figure 4C:
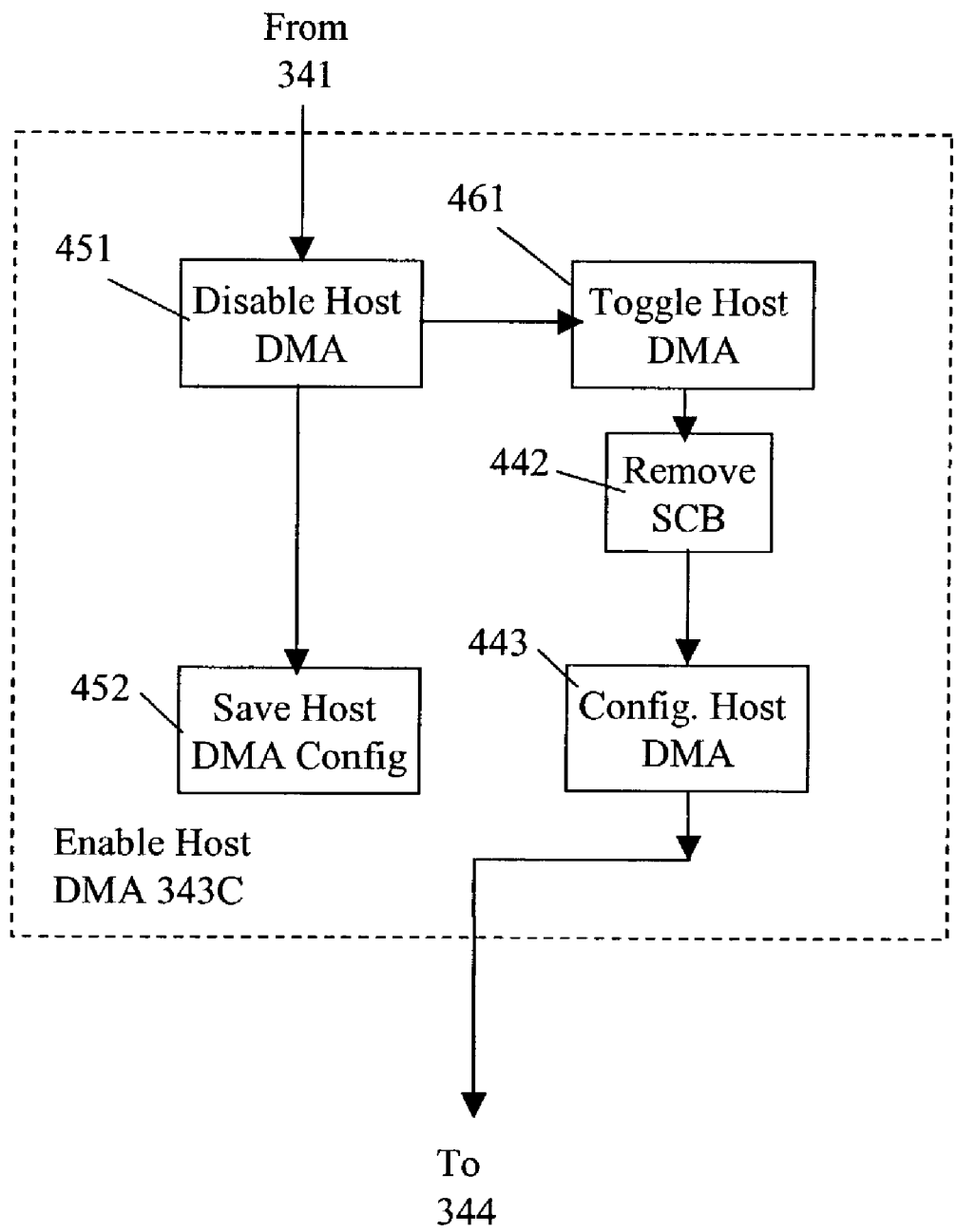
FIG. 4C is a third embodiment of a process for enabling a host adapter module in a host adapter when a target device is ready to receive data and none of the data is cached in the host adapter memory.

In some circumstances, a SCB may be removed from execution queue 245 before the same SCB is removed from enable caching queue 255 and host DMA module 220 is enabled. In these cases, host DMA enabled check operation 341 transfers processing to enable host DMA operation 343, because the caching enabled flag in the current SCB is not asserted. When this happens, host DMA module 220 is transferring information for some other operation, i.e., information for a command in a different SCB, which is a different context. Various alternative embodiments 343A (FIG. 4A), 343B (FIG. 4B) and 343C (FIG. 4C) of enable host DMA operation 343 may be utilized.

In enable host DMA operation 343A, host DMA available check operation 441 determines whether host DMA module 220 is available. If module 220 is available, check operation 441 transfers to remove SCB operation 442 and otherwise returns to itself. Hence, in this embodiment, host enable DMA operation 343A waits until DMA module 220 has completed operation of the data transfer in progress for the different context.

When DMA module 220 has completed the data transfer in progress, remove SCB operation 442 removes the SCB in enable caching queue 255 corresponding to the currently executing SCB. In this embodiment, the pointer to the storage location in SCB array 265 is removed from enable caching queue 255. Operation 442 transfers processing to configure host DMA operation 443.

Configure host DMA operation 443 is equivalent to enable DMA operation 323. In operation 443, information in the current SCB is used to configure and enable host DMA module 220 to transfer data, as specified in the SCB, from in a memory in host system 280 and cache that data in memory 260. Operation 443 transfers to enable target DMA operation 344 (FIG. 3).

In another embodiment, operation 443 first determines whether caching the data is needed, e.g., sequencer 275 reads a flag or field in the current SCB to determine whether a copy of data is to be written to another target device. If caching the data is not needed, a direct data transfer path (not shown) is established between I/O buses 281 and 290 and the data is not cached in memory 260. Conversely, if caching the data is needed, operation 443 enables and configures host DMA module 220 as just described.

Enable host DMA operation 343A is an improvement over the prior art. If it was desired to cache the data for the current SCB in the prior art, it was necessary to wait for the DMA module to complete operation of the data transfer in progress and then to wait for all data for the current SCB to be cached before transfer to the target was initiated. In this embodiment, as soon as data for the current SCB is in memory 260, the data is transferred to the target device. Hence, the wait for all the data for the current SCB to be cached has been eliminated in this embodiment.

In another embodiment of enable host DMA 343, enable host DMA 343B (FIG. 4B), disable host DMA operation 451 stops operation of the DMA engine in host DMA module 220 for the data transfer in progress for a different context. Operation 451 transfers to save host DMA configuration operation 452.

In save host DMA configuration operation 452, the configuration of DMA module 220 is saved so that the stopped data transfer can be resumed later. Operation 452 transfers to remove SCB operation 442.

Operations 442 and 443 are the same as described above and that description is incorporated herein by reference. This embodiment further enhances performance over the prior art because it is not necessary to wait for the data transfer in progress to complete and the wait for all the data for the current SCB to be cached has been eliminated.

Figure 5:
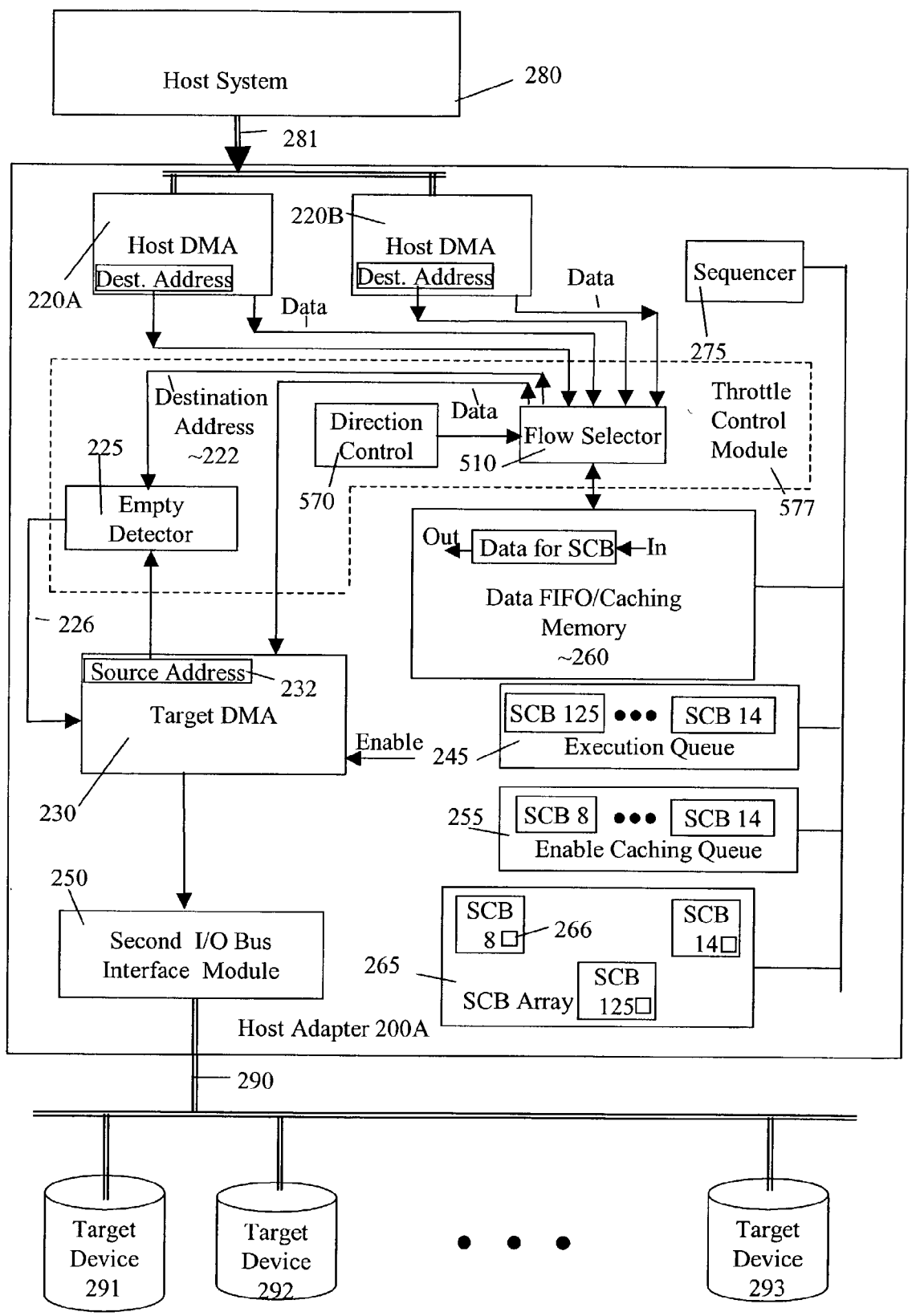
FIG. 5 is a block diagram of a system including a host adapter with multiple host DMA modules for use with the process of FIG. 4C according to one embodiment of the present invention.

Yet another embodiment of enable host DMA 343 that further improves the latency when the data is not yet cached utilizes an architecture that is different from that in FIGS. 2A to 2C. In this embodiment, as illustrated in FIG. 5, host adapter 200A includes two host DMA modules 220A and 220B.

Both modules 220A and 220B can provide data and a destination address from a destination address register to flow selector module 510 in throttle control module 577. Flow selector module 510, in response to signals from direction control circuit 570, connects the data lines from one of modules 220A and 220B to memory 260. Flow selector 510 also connects the destination address from the module selected to empty detector 225 and the data from memory 260 to target DMA module 230.

Thus, the connection from host DMA modules 220A and 220B is toggled to memory 260. One of host DMA modules 220A and 220B is always kept available for any connecting target for which there is no cached data. Hence, in this embodiment, in enable host DMA operation 343C (FIG. 4C), disable host DMA 451 operation, as described above and incorporated herein by reference, disables the host DMA module that had a data transfer in progress for a different context, e.g., DMA module 220A.

While DMA module 220A is being disabled, remove SCB operation 442 and configure host DMA operation 443, as described above and incorporated herein by reference, are performed using the other host DMA module, e.g., DMA module 220B. The only difference is that connection to memory 260 and to empty detector 225 is toggled from host DMA module 220A to host DMA module 220B. After DMA module 220A is disabled, save host DMA configuration operation 452, as described above and incorporated herein by reference, is performed for DMA module 220A.

Thus, DMA module 220A is shut down and the configuration saved while DMA module 220B is enabled and data starts to flow to memory 260. Since shutting down a DMA engine in module 220A and making the DMA engine available can take an appreciable amount of time, the toggling to DMA module 220B allows the other DMA engine in module 220B to be configured, enabled, and transferring data before operations 451 and 452 are completed.

When processing transfers to enable target DMA operation 344, a host DMA module has been configured and enabled to transfer data from host system 280 to data FIFO/caching memory 260. In operation 344, target DMA module 230 is configured and enabled, i.e., a signal ENABLE is asserted, to transfer data from memory 260 through second I/O bus interface module to the target device on I/O bus 290.

Target DMA module 230 is one embodiment of a second I/O bus data transfer module 230. Thus, target DMA module 230 is illustrative only and is not intended to limit the invention to only a DMA module that includes a DMA engine. The particular implementation of the second I/O bus data transfer module is not essential to this invention so long as the module provides the functionality described herein.

Prior to considering the remaining operations in method 300 in further detail, the operation of host adapters 200 and 200A is considered. In this embodiment, target DMA module 230 is throttled in throttle target transfer operation 350 so that data is not read from memory 260 when no data is available in memory 260 for the current context, e.g., the data cache for the current context in memory 260 is empty.

Empty detector 225 (FIGS. 2A to 2C) receives, as a first input signal, a destination address 222 in memory 260 for the current unit of information being transferred to memory 260 from host DMA module 220. Destination address 222 is stored in a destination address register. Empty detector 225 receives, as a second input signal, a source address 232 in memory 260 for the current unit of information being transferred from memory 260 to target DMA module 230. Source address 232 is stored in a source address register.

Empty detector 225 uses destination address 222 and source address 232 to determine when there is no data in memory 260 ready for transfer to the target device, e.g., the data cache is empty for the current context. Depending on the I/O buses used with host adapter 220, the units of data transferred over the two I/O buses may be different, e.g., data is transferred a byte at a time over one I/O bus, and data is transferred in packets that each include a plurality of bytes over the other I/O bus. Consequently, empty detector 225 determines when memory 260 does not include a complete unit of cached data for transfer from memory 260 so that the data cache is either empty or effectively empty.

When there is cached data ready for transfer from memory 260, empty detector 225 de-asserts a signal on throttle line 226 to target DMA module 232. Conversely, when the data cache in memory 260 is empty, empty detector 225 asserts a signal on throttle line 226.

Target DMA module 232 must be enabled to transfer data, e.g., signal ENABLE is asserted. In addition, in this embodiment, the signal on throttle line 226 must be de-asserted. Thus, target DMA module 232 transfers cached data from memory 260 to I/O bus 290 so long as signal ENABLE is asserted and the signal on throttle line 226 is de-asserted. When empty detector 225 asserts a signal on throttle line 226, transfer of data by target DMA module 232 is stopped.

As more data is transferred to memory 260 by DMA module 220, empty detector 225 de-asserts the throttle signal on throttle line 226. Consequently, target DMA module 230 restarts and transfers data from memory 260. In one embodiment, a dead band is implemented in empty detector 225 to prevent repeatedly starting and stopping data transfer by target DMA module 230 for each new unit of data that is cached.

When host DMA module 220 and target DMA module 230 are transferring data for different data contexts, the two input addresses to comparator 225 can never be the same. The caches for the two different data contexts cannot overlap in memory 260.

Returning to method 300, upon completion of operation 344 and transfer to throttle target transfer operation 350, data available check operation 345 determines whether data is cached in memory 260 for the current SCB. There are two possibilities, either all the data for the current SCB is cached in memory 260, i.e., the cache is full, or host DMA module 220 is still transferring data to memory 260.

If data is available, check operation 345 transfers to transfer data operation 346, and otherwise waits until data is available to transfer to operation 346. Transfer data operation 346 proceeds unless target DMA module 230 is stopped by an asserted signal on throttle line 226 or the data transfer is completed. This is illustrated in FIG. 3 by data available check operation 347.

If cached data remains in memory 260 for transfer, data available check operation 347 returns to transfer data operation 346. Hence, so long as data is cached for the current data transfer, operation 346 continues.

When there is no cached data for the current context, check operation 347 transfers to stop transfer operation 348. Stop transfer operation 347 suspends operation of target DMA module 230 by asserting a signal on line 226. Stop transfer operation 347 transfers to transfer complete check operation 349. If all the data has been transferred to the target, signal ENABLE is de-asserted and processing transfers to return. Conversely, if data remains to be transferred, check operation 349 transfers to data available check operation 345. Hence, operations 345 to 349 start, stop, and re-start the data transfer from memory 260 based upon whether cached data for the current context is available for transfer, i.e., throttle the data transfer to the target device.

Again, operation 350 should not be interpreted as requiring polling to determine whether the data transfer is complete or the data transfer has been stopped. As described above, when the data transfer by target DMA module 230 is stopped because data is unavailable in memory 260, the transfer is not restarted by module 230 until data is available. This particular functionality can be implemented using a wide variety of operations.

If processing in method 300 transfers to other event handlers operation 360, the current event is not one of interest for this embodiment of the invention and is handled using the prior art methods. Also, for each of the various events that are handled in method 300, other prior art operations may be included. The operations illustrated for this embodiment are those that are included to facilitate use of data FIFO/caching memory 260.

Method 300, using data FIFO/caching memory 260, has a latency in transferring data to a connected target that is no worse than starting data flow across host bus 281, and that at the best is the latency associated in reading data from memory 260. In addition, all data is transferred across host bus 281 only once. Data is at least cached in memory 260 concurrent with the transfer of that data to a target device on I/O bus 290. Alternatively, data is cached in memory 260 concurrent with the transfer of different data from memory 260 to I/O bus 290.

Figure 2D:
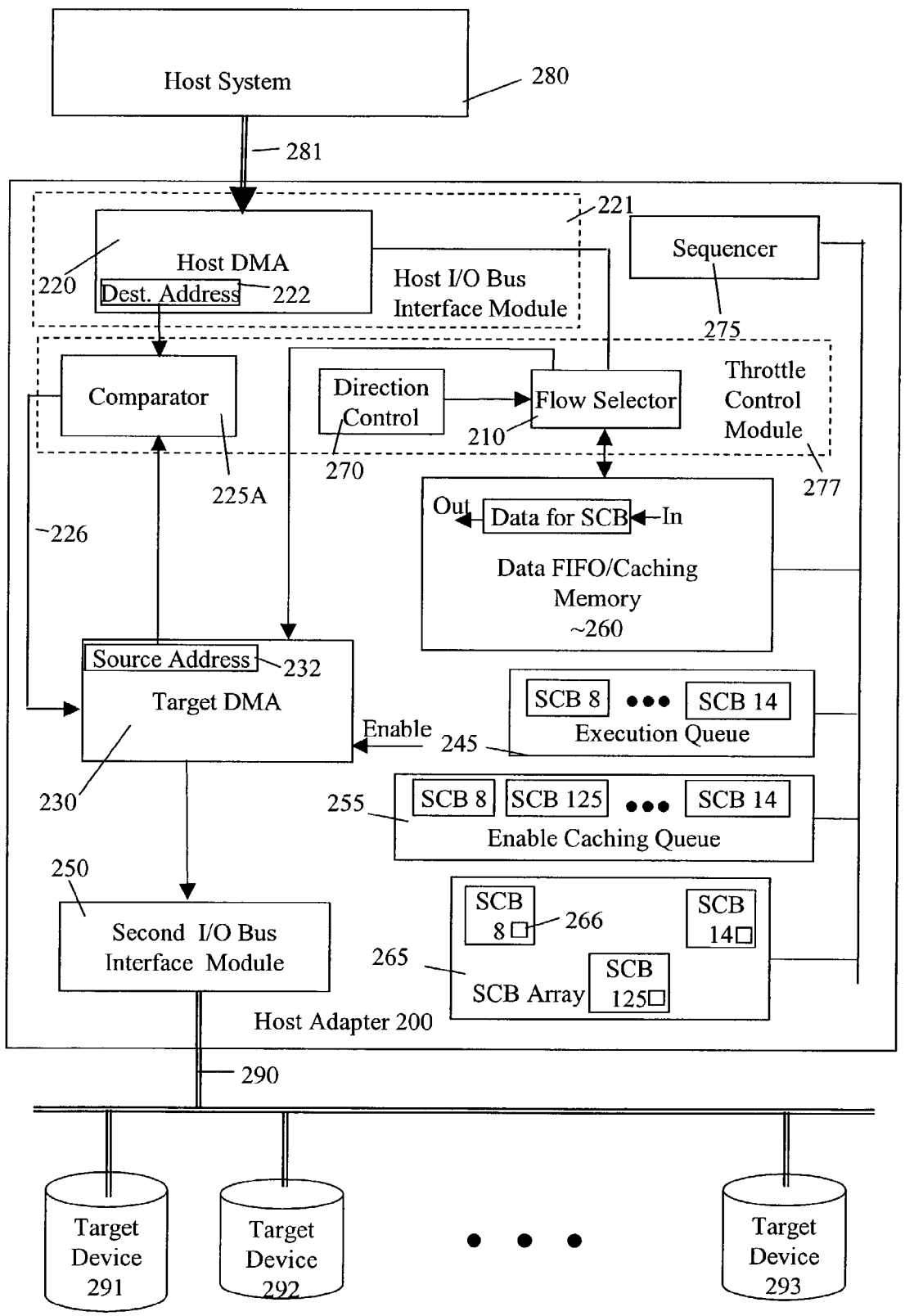
FIG. 2D is a block diagram of the system of FIG. 2A illustrating one embodiment of the empty detector.

FIG. 2D is an illustration of one embodiment of empty detector 225. In this embodiment, empty detector 225 is comparator 225A. Source address 232 and destination address 222 are input signals to comparator 225A. When the two input addresses, addresses 222 and 232, are the same address, comparator 225 asserts a signal on throttle line 226 that stops target DMA module 230. When the two input addresses are the same, the data cache is empty. Consequently, target DMA module 230 is prevented from reading data from memory 260 when there is no data available for transfer.

In view of this disclosure, those of skill in the art can implement the embodiments of this invention in a host adapter of interest. In one embodiment, the host adapter is a SCSI host adapter. In another embodiment, the SCSI host adapter is a parallel SCSI host adapter.

I claim:

1. A method comprising:
  caching data for a context in a memory of a host adapter interfacing a first I/O bus and a second I/O bus wherein a portion of said data for said context is cached in said memory;
  maintaining a queue of host adapter hardware control blocks for which said caching data is to be performed;
  enabling said caching of data associated with a host adapter hardware control block following removing said host adapter hardware control block from said queue; and
  transferring said portion of said data for said context from said memory concurrently with said caching data for a context in a memory caching another portion of said data for said context in said memory.

2. The method of claim 1 further comprising:
  asserting a flag in said host adapter hardware control block indicating said enabling said caching of data.

3. The method of claim 1 further comprising:
  maintaining an execution queue of host adapter hardware control blocks.

4. The method of claim 1 further comprising:
  determining whether an enable caching flag is asserted in a host adapter hardware control block prior to initiating said transferring said data.

5. The method of claim 1 further comprising:
  throttling said transferring of said data based upon whether cached data is available in said memory for transfer from said memory.

6. The method of claim 1 wherein said host adapter is a SCSI host adapter and said second I/O bus is a SCSI bus.

7. A method comprising:
  maintaining a queue of host adapter hardware control blocks for which caching of data is to be performed;
  removing a host adapter hardware control block from said queue upon a first I/O bus data transfer module becoming available;
  enabling said first I/O bus data transfer module to transfer data specified in said host adapter hardware control block;
  asserting a flag in said host adapter hardware control block indicating said enabling;
  caching said data in a memory of a host adapter interfacing a first I/O bus and a second I/O bus by using said first I/O bus data transfer module to transfer said data to said memory; and
  transferring said data, concurrently with said caching, from said memory.

8. The method of claim 7 further comprising:
  throttling said transferring of said data based upon whether cached data is available in said memory for transfer from said memory.

9. The method of claim 7 wherein said host adapter is a SCSI host adapter and said second I/O bus is a SCSI bus.

10. A method comprising:
loading a pointer to a hardware control block in an execution queue of a host adapter interfacing a first I/O bus and a second I/O bus;
loading another pointer to said hardware control block in an enable caching queue of said host adapter;
removing said another pointer to said hardware control block from said enable caching queue upon a first I/O bus data transfer module becoming available; and
enabling said first I/O bus data transfer module to transfer data from said first I/O bus to a data first-in-first-out (FIFO)/caching memory of said host adapter following said removing said another pointer;
asserting a flag in said hardware control block to indicate said enabling said first I/o bus data transfer module;
caching data in said data FIFO/caching memory by transferring said data from said first I/O bus to said data FIFO/caching memory using said first I/O bus data transfer module following said enabling;
removing said pointer to said hardware control block from said execution queue;
determining whether said flag in said hardware control block is asserted; and
transferring said data from said data FIFO/caching memory upon said determining finding that said flag in said hardware control block is asserted.

11. The method of claim 10 further comprising:
stopping said first I/O bus data transfer module upon said determining finding that said flag in said hardware control block is unasserted.

12. The method of claim 10 wherein said host adapter is a SCSI host adapter and said second I/O bus is a SCSI bus.

13. A host adapter comprising:
a first I/O bus data transfer module;
a second I/O bus data transfer module;
a data first-in-first-out (FIFO)/caching memory coupled to said first I/O bus data transfer module and to said second I/O bus data transfer module; and
a throttle control module coupled to said first I/O bus data transfer module, to said second I/o bus data transfer module, and to said data FIFO/caching memory, wherein said throttle control module controls data transfer from said data FIFO/caching memory by said second I/O bus data transfer module as data is concurrently being transferred into said data FIFO/caching memory using said first I/O bus data transfer module.

14. The host adapter of claim 13 wherein said first I/O bus data transfer module further comprises a data-FIFO/caching-memory destination address register.

15. The host adapter of claim 14 wherein said second I/O bus data transfer module further comprises a data-FIFO/caching-memory source address register.

16. The host adapter of claim 15 wherein said throttle control module further comprises:
an empty detector coupled to said data-FIFO/caching-memory destination address register and to said data-FIFO/caching-memory source address register and having an output line coupled to said second I/O bus data transfer module.

17. The host adapter of claim 16 wherein said empty detector comprises a comparator.

18. The host adapter of claim 13 wherein said second I/O bus data transfer module further comprises a data-FIFO/caching-memory source address register.

19. The host adapter of claim 13 further comprising:
an enable caching queue.

20. The host adapter of claim 13 wherein said host adapter is a SCSI host adapter and said second I/O bus is a SCSI bus.

21. A system comprising:
a first I/O bus;
a second I/O bus; and
a host adapter comprising:
a first I/O bus data transfer module coupled to said first I/O bus;
a second I/O bus data transfer module coupled to said second I/O bus;
a data first-in-first-out (FIFO)/caching memory coupled to said first I/O bus data transfer module and to said second I/O bus data transfer module; and
a throttle control module coupled to said first I/O bus data transfer module, to said second I/O bus data transfer module, and to said data-FIFO/caching memory, wherein said throttle control module controls data transfer from said data FIFO/caching memory by said second I/O bus data transfer module as data is concurrently being transferred into said data FIFO/caching memory using said first I/O bus data transfer module.

* * * * *